United States Patent [19]

Chang et al.

[11] 3,907,915

[45] Sept. 23, 1975

[54] CONVERSION OF CARBONYL COMPOUNDS TO AROMATICS

[75] Inventors: Clarence D. Chang, Princeton; William H. Lang, Pennington, both of N.J.; Anthony J. Silvestri, Morrisville, Pa.

[73] Assignee: Mobil Oil Corporation, New York, N.Y.

[22] Filed: Aug. 9, 1973

[21] Appl. No.: 387,224

[52] U.S. Cl.......... 260/668 R; 208/141; 260/671 R; 260/673; 260/673.5; 260/682
[51] Int. Cl.² .............................................. C07C 1/20
[58] Field of Search......... 208/135, 141; 260/668 R, 260/449 R, 449 M, 449 L, 449.5, 671 R, 671 C, 671 M, 673.5, 673, 682; 252/455 Z

[56] References Cited
UNITED STATES PATENTS

| | | | |
|---|---|---|---|
| 3,728,408 | 4/1973 | Tobias | 260/668 C |
| 3,751,504 | 8/1973 | Keown et al. | 260/672 T |
| 3,751,506 | 8/1973 | Burress | 260/671 R |
| 3,755,483 | 8/1973 | Burress | 260/671 R |

Primary Examiner—C. Davis
Attorney, Agent, or Firm—Charles A. Huggett; Michael G. Gilman

[57] ABSTRACT

Conversion of aliphatic carbonyl containing compounds, by contacting such at elevated temperatures with a crystalline aluminosilicate zeolite having a silica to alumina ratio of at least about 12, a constraint index of about 1 to 12, and preferably a crystal density in the hydrogen form of not substantially below about 1.6 grams per cubic centimeter. Conversion is preferably to hydrocarbons with a higher number of carbon atoms per molecule.

12 Claims, No Drawings

CONVERSION OF CARBONYL COMPOUNDS TO AROMATICS

This invention relates to the conversion of carbonyl containing compounds. It more particularly refers to the conversion of ketones, carboxylic acids and esters to hydrocarbons, preferably to hydrocarbons in the form of new aromatic ring moieties.

The conversion of aliphatic organic moieties to aromatic moieties is always of interest because in general aromatic materials are less prevalent in nature and are generally somewhat more desirable and expensive. In the petroleum industry, lighter aromatics are very important materials, particularly if they boil in the normal gasoline boiling range, because they have very high octane numbers and are therefore excellent gasoline blend stocks.

Lower aliphatic petroleum fractions are generally not used in gasoline but they are converted by the chemical industry into relatively inexpensive oxygenated chemical intermediates including aldehydes, ketones, acids and esters. A technique for the efficient conversion of these types of compounds to aromatics therefore can be considered as a technique for upgrading the very light end of crude oil from non-gasoline components to very high octane gasoline components.

U.S. Pat. No. 2,950,332, issued Aug. 23, 1960 in the name of Mattox, discloses and claims the conversion of ketones to aromatics by contact with a crystalline zeolite catalyst having pore openings of 6 to 15 A. and silica to alumina ratios of 3 to 1 to 10 to 1 at elevated temperatures of about 300° to 900°F. The entirety of this patent is incorporated herein by reference as showing the state of the art to which this invention is directed.

The data presented in this patent show that at an operating temperature of 500°F there was a 43% conversion of acetone to aromatics of $C_9^+$ (trimethyl benzenes and higher) type. At 600°F this conversion was increased to 70% but the selectivity to aromatics was apparently reduced (see Example 2 of the patent).

It is therefore an important object of this invention to provide a novel process for converting carbonyl containing moieties to new aromatic ring compounds.

It is another object of this invention to provide a technique for improving the conversion of carbonyl compounds to aromatic hydrocarbons.

Other and additional objects of this invention will become apparent from a consideration of this entire specification including the claims hereof.

In accord with and fulfilling these objects, one aspect of this invention resides in a process comprising converting at least one carbonyl compound having the formula:

wherein R is hydrogen or an alkyl or aryl radical, and R' is a hydrogen, hydroxyl, alkoxy, aryloxy, aryl or alkyl radical, in the effective presence of a crystalline aluminosilicate zeolite having a silica to alumina ratio of at least about 12, a constraint index of about 1 to 12, as those terms are hereinafter defined, at an elevated temperature of up to about 1,000°F, preferably about 400° to 850°F, to a hydrocarbon product containing a substantial proportion, preferably a preponderance, of aromatics.

The active reactant referred to herein is suitably a ketone, an aldehyde, a carboxylic acid, a carboxylic acid ester, a mixture thereof or the like. The alkyl and alkoxy groups referred to above are suitably lower alkyl or alkoxy groups preferably having up to about eight carbon atoms in straight or branched chain configuration. Aryl or aryloxy groups are suitably monocyclic and may or may not have one or more lower alkyl or halo substituents thereon. The alkyl and alkoxy substituents with about one to four carbon atoms are preferred. Exemplary reactants are acetone, acetaldehyde, methyl formate, acetic acid, acetic anhydride, methyl ethyl ketone, methyl vinyl ketone, methyl isobutyl ketone, di-n-butyl ketone, acetophenone, benzophenone, ethyl acetate, ethyl propionate, 2-ethylhexyl butyrate, butyric acid, propionic acid, etc.

It is within the scope of this invention to convert the carbonyl containing compounds fed as individuals or as admixtures of normal chemical purity. It is also within the scope of this invention to feed such carbonyl containing reactants in admixture with other, non-carbonyl containing materials. These other fed materials may be reactive or inert under the conditions of this process. Their presence or absence is not a part of this invention. Thus, for example, it is the subject of concurrently filed patent applications of different inventors to convert alcohols and/or ethers to more complex compounds under substantially the same conditions as are set forth herein. The cofeeding and coreaction of the feeds, or one of them, set forth in said other patent application with the feeds of this application, including possible interaction of these feeds and/or intermediates produced therefrom is not considered to be outside the scope of either this or that patent application. Rather, such is considered to be within the scope of each respective application as to the portion of the feed related to that application.

This recently discovered novel class of zeolites has some unusual properties. These catalysts induce profound transformations of aliphatic hydrocarbons to aromatic hydrocarbons in commercially desirable yields. Although they have unusually low alumina contents, i.e., high silica to alumina ratios, they are very active even when the silica to alumina ratio exceeds 30. The activity is surprising since the alumina in the zeolite framework is believed responsible for catalytic activity. These catalysts retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity.

An important characteristic of the crystal structure of this class of zeolites is that it provides constrained access to, and egress from, this intracrystalline free space by virtue of having a pore dimension greater than about 5 A. and pore windows of about the size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type catalyst useful in this invention posess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although catalysts with a silica to alumina ratio of at least 12 are useful, it is preferred to use catalysts having higher ratios of at least about 30. Such catalysts, after activation, acquire an intracrystalline sorption capacity for normal hexane which is greater than that for water, i.e., they exhibit "hydrophobic" properties. It is believed that this hydrophobic character is advantageous in the present invention.

The type zeolites useful in this invention freely sorb normal hexane and have a pore dimension greater than about 5 A. In addition, the structure must provide constrained access to larger molecules. It is sometimes possible to judge from a known crystal structure whether such constrained access exists. For example, if the only pore windows in a crystal are formed by eight membered rings of oxygen atoms, then access to molecules of larger cross-section than normal hexane is excluded and the zeolite is not of the desired type. Windows of 10-membered rings are preferred, although excessive puckering or pore blockage may render these catalysts ineffective. Twelve-membered rings do not generally appear to offer sufficient constraint to produce the advantageous conversions, although structures can be conceived, due to pore blockage or other cause, that may be operative.

Rather than attempt to judge from crystal structure whether or not a catalyst posesses the necessary constrained access, a simple determination of the "constraint index" may be made by passing continuously a mixture of equal weight of normal hexane and 3-methylpentane over a small sample, approximately 1 gram or less, of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1,000°F for at least 15 minutes. The catalyst is then flushed with helium and the temperature adjusted between 550°F and 950°F to give an overall conversion between 10% and 60%. The mixture of hydrocarbons is passed at 1 liquid hourly space velocity (i.e. 1 volume of hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Catalysts suitable for the present invention are those having a constraint index from 1.0 to 12.0, preferably 2.0 to 7.0

The class of zeolites defined herein is exemplified by ZSM-5, ZSM-11, ZSM-12, ZSM-21, TEA mordenite and other similar materials. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in West German Offenlagunschrifft No. 2,213,109, the entire contents of which are incorporated herein by reference.

ZSM-21 is more particularly described in U.S. application Ser. No. 358,192, filed May 7, 1973, the entire contents of which are incorporated herein by reference.

TEA mordenite is more particularly described in U.S. application Ser. No. 130,442 filed Apr. 11, 1971, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1,00°F for 1 hour, for example, followed by base exchange with ammonium salts followed by calcination at 1,000°F in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1,000°F for from about 15 minutes to about 24 hours.

Natural zeolites may sometimes be converted to this type zeolite catalysts by various activation procedures and other treatments such as base exchange, steaming, alumina extraction and calcination, in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12, ZSM-21 and TEA mordenite, with ZSM-5 particularly preferred.

The catalysts of this invention may be in the hydrogen form or they may be base exchanged or impregnated to contain ammonium or a metal cation complement. It is desirable to calcine the catalyst after base exchange. The metal cations that may be present include any of the cations of the metals of Groups I through VIII of the periodic table. However, in the case of Group IA metals, the cation content should in no case be so large as to effectively inactivate the catalyst. For example, a completely sodium exchanged H-ZSM-5 is not operative in the present invention.

In a preferred aspect of this invention, the catalysts hereof are selected as those having a crystal density, in the dry hydrogen form, of not substantially below about 1.6 grams per cubic centimeter. It has been found that zeolites which satisfy all three of these criteria are most desired because they tend to maximize the production of gasoline boiling range hydrocarbon products. Therefore, the preferred catalysts of this invention are those having a constraint index as defined above of about 1 to 12, a silica to alumina ratio of at least about 12 and a dried crystal density of not less than about 1.6 grams per cubic centimeter. The dry density for known structures may be calculated from the number of silicon plus aluminum atoms per 1,000 cubic A., as given, e.g. on page 11 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, is important as the locus of catalytic activity.

A remarkable and unique attribute of this type of zeolite is its ability to convert paraffinic hydrocarbons to aromatic hydrocarbons in exceptionally fine, commercially attractive yields by simply contacting such paraffins with such catalyst at high temperatures of about 800° to 1,500°F and low space velocities of about 1 to 15 WHSV. This type of zeolite seems to exert little or no action upon aromatic rings present in the feed to such process or formed in such process from the point of view of destroying (cracking) such rings. It does however have the ability, with or without the presence of a special hydrogen transfer functionality and with or without the presence of added hydrogen in the reaction mixture, to cause paraffinic fragments, which presumably have been cracked from paraffinic feed components, to alkylate aromatic rings at somewhat lower temperatures of up to about 800° to 1,000°F. It appears that the operative ranges for alkylation and formation of new aromatic rings overlap but that the optimum ranges are distinct, aromatization being at a higher temperature. The exact mechanisms for these catalytic functions are not fully known or completely understood.

The zeolite catalyst can be used as such or in a matrix form, that is incorporated in a matrix, suitably of alumina. The catalyst bed may be fixed or fluidized as desired. Suitable catalyst particle sizes, whether in a matrix or not, are about 4 to 325 mesh, preferably about 8 to 30 mesh for fixed bed, downflow operation, or about 40 to 325 mesh for fluidized bed operation.

Operating parameters other than catalyst composition and temperature are not particularly critical. Generally pressures of about 1 to 200 atmospheres and space velocities of about 0.5 to 50 LHSV are suitable. There does seem to be some product composition variation dependent upon operating temperature. The conversion of carbonyl compounds to ethers and/or olefins seems to take place at relatively low temperatures, sometimes accompanied by a decarbonylation or a decarboxylation. Thus methyl formate is converted to dimethyl ether at about 500°F in fair yields. Acetone has been converted to propene and butenes at about 500° to 600°F. Other similar conversions have been experienced. The conversion of carbonyl compounds to other compounds having a higher carbon to oxygen ratio than its respective reactant is a hallmark of the instant process. The efficiency of this phenomenon seems to be unique to this peculiar type catalyst.

The temperature dependence of the conversion of carbonyl containing compounds according to this invention is an overlapping matter; that is, there is no clean line of demarcation from product to product along the temperature scale. Rather, there seems to be a gradual change in product distribution with temperature, the carbon to oxygen ratio of the products becoming progressively greater as the conversion temperature increases. Further, there seems to be a progressively increasing product aromatization with increasing conversion temperature.

The following Examples are illustrative of this invention and are not to be considered to be limiting on the scope thereof. Parts and percentages are by weight unless expressly stated to be on another basis.

In each of the following Examples the reactant was passed through a bed of appropriate aluminosilicate zeolite in a stainless steel tube suitably associated with heating elements. The catalyst was in an alumina matrix, which constituted 35% of the total matrix. The catalyst had been calcined in air for 10 hours at 1,000°F.

EXAMPLE 1

The reactant was methyl formate; reaction parameters were 700°F, 0.67 LHSV, and 1 atmosphere absolute pressure. The catalyst was H ZSM-5. The product was about 25% hydrocarbons of which about 40% was aromatics. Also produced were 32% water and 43% carbon monoxide.

EXAMPLE 2

The reactant was acetic acid; reaction parameters were 700°F, 0.67 LHSV and 1 atmosphere absolute pressure. The catalyst was H ZSM-5. About 34% of the acetic acid was converted to other than oxygenated hydrocarbon products. Of the non-oxygenated-hydrocarbon portion of the product, about two-thirds was carbon dioxide and about one-third was hydrocarbons. As much as 86% of the hydrocarbon product was analyzed as aromatic.

EXAMPLE 3

The reactant was acetone; reaction parameters were 700°F, 1.0 LHSV, and 1 atmosphere absolute pressure. The catalyst was H ZSM-5. The product was about two-thirds hydrocarbon with the other third a mixture of predominantly water with some carbon dioxide. Substantially all of the acetone was converted. Of the hydrocarbon product about 69% was aromatic with xylenes and $C_9$ aromatics predominating. Significant yields of ethylene and propylene as well as mixed $C_4$ compounds were obtained. In this case the catalyst was ZSM-5 which had been exchanged to introduce 0.43% cerium therein.

Examples 4 – 10
CONVERSION OF CARBONYL CPDS OVER H ZSM-5

| Example No. Feed | 4 Propion- aldehyde | 5 Acetone* | 6 Cyclo- Pentanone | 7 Hexanoic Acid | 8 n-Butyl Formate | 9 n-Propyl Acetate | 10 Actone |
|---|---|---|---|---|---|---|---|
| Conditions | | | | | | | |
| T, °F | 700 | 600 | 700 | 700 | 700 | 700 | 700 |
| P, psig | 0 | 0 | 0 | 0 | 0 | 0 | 50 |

Examples 4 – 10 – Continued
CONVERSION OF CARBONYL CPDS OVER H ZSM-5

| Example No. | 4 | 5 | 6 | 7 | 8 | 9 | 10 |
|---|---|---|---|---|---|---|---|
| Feed | Propion-aldehyde | Acetone* | Cyclo-Pentanone | Hexanoic Acid | n-Butyl Formate | n-Propyl Acetate | Actone |
| LHSV, HR $^{-1}$ | 1 | 1 | 1 | 1 | 1 | 1 | 1.22 |
| Conversion % | 100 | 14.8 | 50 | 11.4 | 100 | 97.9 | 99.8 |
| Hydrocarbon Product Distribution, Wt% | | | | | | | |
| $C_3^-$ | 16.54 | 76.53 | 7.27 | 10.77 | 50.11 | 45.54 | 7.69 |
| $C_5^+$ non-aromatics | 3.84 | 0.54 | 13.53 | 69.47 | 14.73 | 6.22 | 8.44 |
| Aromatics | 79.62 | 22.93 | 79.22 | 19.76 | 35.16 | 48.24 | 83.87 |

*Catalyst: Ce H ZSM-5

What is claimed is:

1. In the process for converting a carbonyl containing aliphatic organic compound reactant which comprises catalyzing said conversion with a crystalline aluminosilicate zeolite having a high silica to alumina ratio; the improvement which comprises catalyzing said conversion with a crystalline aluminosilicate zeolite having a silica to alumina ratio of at least about 12 and a constraint index of about 1 to 12; carrying out said conversion at about 1 to 200 atmospheres, 0.5 to 50 LHSV and 400° to 1,000°F; and converting said carbonyl compounds to a product comprising water and a conjunct mixture of hydrocarbons having a $C_5^+$ non-aromatic hydrocarbon fraction, a $C_4^-$ normally gaseous hydrocarbon fraction and an aromatic hydrocarbon fraction boiling in the gasoline boiling range.

2. The improved process claimed in claim 1 including passing said reactant through a fixed bed of said catalyst.

3. The improved process claimed in claim 1 including converting said carbonyl compound to a product comprising full range, hydrocarbon gasoline.

4. The improved process claimed in claim 1 including providing said catalyst as said zeolite in an alumina matrix.

5. A process as claimed in claim 1 wherein said zeolite is H ZSM-5.

6. A process as claimed in claim 1 wherein said zeolite is Ce ZSM-5.

7. A process as claimed in claim 1 wherein said organic compound reactant has up to about eight carbon atoms in its longest continuous carbon to carbon chain.

8. A process as claimed in claim 1 wherein said reactant is a member selected from the group consisting of carboxylic acid esters, aldehydes and ketones.

9. A process as claimed in claim 1 wherein said reactant is a member selected from the group consisting of propionaldehyde, cyclopentanone, hexanoic acid, n-butyl formate, propylacetate, methyl formate, acetic acid and acetone.

10. A process as claimed in claim 1 wherein said reactant is acetone.

11. A process as claimed in claim 1 wherein said zeolite has a crystal density in the hydrogen form of not substantially below about 1.6 grams per cubic centimeter.

12. A process as claimed in claim 1 carried out with a ketone reactant having up to about eight carbon atoms in the alkyl groups thereof at up to about 850°F under conditions sufficient to convert said reactant to a product having a preponderant hydrocarbon content which is preponderantly aromatic.

* * * * *

UNITED STATES PATENT AND TRADEMARK OFFICE
CERTIFICATE OF CORRECTION

PATENT NO. : 3,907,915
DATED : September 23, 1975
INVENTOR(S) : CLARENCE D. CHANG, WILLIAM H. LANG and ANTHONY J. SILVESTRI It is certified that error appears in the above-identified patent and that said Letters Patent are hereby corrected as shown below:

| | |
|---|---|
| Column 4, line 27 | "1,00°F" should be --1,000°F-- |
| Column 7, Table First Column | "$C_5$" should be --$C_5^=$-- |
| Column 6, Table Last Column | Example 10 "actone" should be --acetone-- |

Signed and Sealed this eighteenth Day of May 1976

[SEAL]

Attest:

RUTH C. MASON
*Attesting Officer*

C. MARSHALL DANN
*Commissioner of Patents and Trademarks*